US012683060B2

(12) United States Patent
Kawamura et al.

(10) Patent No.: US 12,683,060 B2
(45) Date of Patent: Jul. 14, 2026

(54) WOUND CORE

(71) Applicant: NIPPON STEEL CORPORATION, Tokyo (JP)

(72) Inventors: Yusuke Kawamura, Tokyo (JP); Takahito Mizumura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 676 days.

(21) Appl. No.: 18/032,519

(22) PCT Filed: Oct. 26, 2021

(86) PCT No.: PCT/JP2021/039551
§ 371 (c)(1),
(2) Date: Apr. 18, 2023

(87) PCT Pub. No.: WO2022/092114
PCT Pub. Date: May 5, 2022

(65) Prior Publication Data

US 2024/0096540 A1 Mar. 21, 2024

(30) Foreign Application Priority Data

Oct. 26, 2020 (JP) ................................ 2020-178898

(51) Int. Cl.
*H01F 27/24* (2006.01)
*H01F 1/14* (2006.01)
(Continued)

(52) U.S. Cl.
CPC ....... *H01F 27/245* (2013.01); *H01F 1/14775* (2013.01)

(58) Field of Classification Search
CPC .......................... H01F 27/245; H01F 1/14775
See application file for complete search history.

(56) References Cited

U.S. PATENT DOCUMENTS 6,083,326 A 7/2000 Komatsubara et al.
2013/0213525 A1* 8/2013 Shingaki .................. C23C 2/24 148/108
(Continued)

FOREIGN PATENT DOCUMENTS

AU 2012337260 A1 5/2014
EP 3 101 667 B1 12/2019
(Continued)

OTHER PUBLICATIONS

Japanese Patent Office, Decision to Grant a Patent, Jul. 9, 2024 (Year: 2024).*

*Primary Examiner* — Malcolm Barnes
(74) *Attorney, Agent, or Firm* — Birch, Stewart, Kolasch & Birch, LLP

(57) ABSTRACT

This wound core is a wound core including a wound core main body obtained by stacking a plurality of polygonal annular grain-oriented electrical steel sheets in a side view, and the grain-oriented electrical steel sheet has planar portions and bent portions that are alternately continuous in a longitudinal direction, and in at least one bent portion, the crystal grain size Dpx (mm) of the grain-oriented electrical steel sheet is FL/4 or more. Here, FL the an average length (mm) of the planar portions.

3 Claims, 7 Drawing Sheets

(51) Int. Cl.
*H01F 1/147* (2006.01)
*H01F 27/245* (2006.01)

(56) References Cited

U.S. PATENT DOCUMENTS

| | | | | |
|---|---|---|---|---|
| 2016/0172087 | A1* | 6/2016 | Theisen | H01F 27/25 148/403 |
| 2020/0370153 | A1* | 11/2020 | Imamura | C22C 38/04 |
| 2021/0043358 | A1* | 2/2021 | Inoue | H01F 1/16 |
| 2022/0372589 | A1 | 11/2022 | Nakamura et al. | |

FOREIGN PATENT DOCUMENTS

| | | | | | |
|---|---|---|---|---|---|
| JP | 6-89805 | A | | 3/1994 | |
| JP | 8-134660 | A | | 5/1996 | |
| JP | 10-183313 | A | | 7/1998 | |
| JP | 2001-192785 | A | | 7/2001 | |
| JP | 2005-240079 | A | | 9/2005 | |
| JP | 2005-286169 | A | | 10/2005 | |
| JP | 2012-52229 | A | | 3/2012 | |
| JP | 5332946 | B2 | * | 11/2013 | |
| JP | 2017157806 | A | * | 9/2017 | H01F 27/2455 |
| JP | 6224468 | B2 | | 11/2017 | |
| JP | 2018148036 | A | * | 9/2018 | H01F 3/04 |
| JP | 2019-87619 | A | | 6/2019 | |
| JP | 2019087619 | A | * | 6/2019 | |
| WO | WO 2013/074268 | A1 | | 5/2013 | |
| WO | WO 2019/131974 | A1 | | 7/2019 | |
| WO | WO 2019/151399 | A1 | | 8/2019 | |
| WO | WO 2020/027219 | A1 | | 2/2020 | |

* cited by examiner

WOUND CORE

TECHNICAL FIELD

The present invention relates to a wound core. Priority is claimed on Japanese Patent Application No. 2020-178898, filed Oct. 26, 2020, the content of which is incorporated herein by reference.

BACKGROUND ART

A grain-oriented electrical steel sheet is a steel sheet containing 7 mass % or less of Si and has a secondary recrystallization texture in which secondary recrystallization grains are concentrated in the {110}<001> orientation (Goss orientation). The magnetic properties of the grain-oriented electrical steel sheet greatly influence the degree of concentration in the {110}<001> orientation. In recent years, grain-oriented electrical steel sheets that have been put into practical use are controlled so that the angle between the crystal <001> direction and the rolling direction is within a range of about 5°.

Grain-oriented electrical steel sheets are stacked and used in iron cores of transformers, and in addition to main magnetic properties such as a high magnetic flux density and a low iron loss, magneto-striction which causes vibration and noise is required to be small. It is known that the crystal orientation has a strong correlation with these properties, and for example, Patent Documents 1 to 3 disclose precise orientation control techniques.

In addition, the influence of the crystal grain size in the grain-oriented electrical steel sheet is well known, and Patent Documents 4 to 7 disclose a technique for improving properties by controlling the crystal grain size.

In addition, in the related art, for wound core production as described in, for example, Patent Document 8, a method of winding a steel sheet into a cylindrical shape, then pressing the cylindrical laminated body without change so that the corner portion has a constant curvature, forming it into a substantially rectangular shape, then performing annealing to remove strain, and maintaining the shape is widely known.

On the other hand, as another method of producing a wound core, techniques such as those found in Patent Documents 9 to 11 in which portions of steel sheets that become corner portions of a wound core are bent in advance so that a relatively small bending area with a radius of curvature of 3 mm or less is formed and the bent steel sheets are stacked to form a wound core are disclosed. According to this production method, a conventional large-scale pressing process is not required, the steel sheet is precisely bent to maintain the shape of the iron core, and processing strain is concentrated only in the bent portion (corner) so that it is possible to omit strain removal according to the above annealing process, and its industrial advantages are great and the applications thereof are expanding.

CITATION LIST

Patent Document

[Patent Document 1]
Japanese Unexamined Patent Application, First Publication No. 2001-192785
[Patent Document 2]
Japanese Unexamined Patent Application, First Publication No. 2005-240079
[Patent Document 3]
Japanese Unexamined Patent Application, First Publication No. 2012-052229
[Patent Document 4]
Japanese Unexamined Patent Application, First Publication No. H6-89805
[Patent Document 5]
Japanese Unexamined Patent Application, First Publication No. H8-134660
[Patent Document 6]
Japanese Unexamined Patent Application, First Publication No. H10-183313
[Patent Document 7]
WO 02019/131974
[Patent Document 8]
Japanese Unexamined Patent Application, First Publication No. 2005-286169
[Patent Document 9]
Japanese Patent No. 6224468
[Patent Document 10]
Japanese Unexamined Patent Application, First Publication No. 2018-148036
[Patent Document 11]
Australian Patent Application Publication No. 2012337260

SUMMARY OF THE INVENTION

Problems to be Solved by the Invention

An object of the present invention is to provide a wound core produced by a method of bending steel sheets in advance so that a relatively small bending area having a radius of curvature of 5 mm or less is formed and stacking the bent steel sheets to form a wound core, and the wound core is improved so that the generation of unintentional noise is minimized.

Means for Solving the Problem

The inventors studied details of noise of a transformer iron core produced by a method of bending steel sheets in advance so that a relatively small bending area having a radius of curvature of 5 mm or less is formed and stacking the bent steel sheets to form a wound core. As a result, they recognized that, even if steel sheets with substantially the same crystal orientation control and substantially the same magneto-striction magnitude measured with a single sheet are used as a material, there is a difference in iron core noise.

Investigating the cause, they found that the difference in noise that is a problem is caused by the influence on the crystal grain size of the material. In addition, they found that the degree of this phenomenon (that is, the difference in noise of the iron core) also varies depending on the sizes and shapes of the iron core.

In this regard, they studied various steel sheet production conditions and iron core shapes, and classified the influences on noise. As a result, they obtained the result in which steel sheets produced under specific production conditions are used as iron core materials having specific sizes and shapes, and thus iron core noise can be minimized so that it becomes optimal noise according to magnetostrictive properties of the steel sheet material.

The gist of the present invention, which has been made to achieve the above object, is as follows.

A wound core according to one embodiment of the present invention is a wound core including a wound core main body obtained by stacking a plurality of polygonal annular grain-oriented electrical steel sheets in a sheet thickness direction in a side view, wherein the grain-oriented electrical steel sheet has planar portions and bent portions that are alternately continuous in a longitudinal direction, the bent portion in a side view has an inner radius of curvature r of 1 mm or more and 5 mm or less, the grain-oriented electrical steel sheet has a chemical composition containing, in mass %, Si: 2.0 to 7.0%, with the remainder being Fe and impurities, and has a texture oriented in the Goss orientation, and in at least one of the bent portions, the crystal grain size Dpx (mm) of the stacked grain-oriented electrical steel sheet is FL/4 or more.

Here, Dpx (mm) is the average value of Dp obtained by the following Formula (1), Dc (mm) is the average crystal grain size in a direction in which a boundary line extends (hereinafter referred to as a "boundary direction") at respective boundaries between the bent portion and two planar portions arranged with the bent portion therebetween, Dl (mm) is the average crystal grain size in a direction perpendicular to the boundary direction at the boundary, and FL (mm) is the average length of a shorter planar portion between two adjacent planar portions with the bent portion therebetween. Here, when the lengths of two adjacent planar portions with the bent portion therebetween are equal, the length of either planar portion is used.

In addition, the average value of Dp is the average value of Dp on the inner side and Dp on the outer side of one planar portion between two planar portions and Dp on the inner side and Dp on the outer side of the other planar portion.

$$Dp=\sqrt{(Dc\times Dl/\pi)} \tag{1}$$

In addition, a wound core according to another embodiment of the present invention is a wound core including a wound core main body obtained by stacking a plurality of polygonal annular grain-oriented electrical steel sheets in a sheet thickness direction in a side view, wherein the grain-oriented electrical steel sheet has planar portions and bent portions that are alternately continuous in a longitudinal direction, the bent portion in a side view has an inner radius of curvature r of 1 mm or more and 5 mm or less, the grain-oriented electrical steel sheet has a chemical composition containing, in mass %, Si: 2.0 to 7.0%, with the remainder being Fe and impurities, and has a texture oriented in the Goss orientation, and in at least one of the bent portions, the crystal grain size Dpy (mm) of the stacked grain-oriented electrical steel sheet is FL/4 or more.

Here, Dpy (mm) is the average value of Dl (mm),

Dl (mm) is the average crystal grain size in a direction perpendicular to the boundary direction at respective boundaries between the bent portion and two planar portions arranged with the bent portion therebetween, and FL (mm) is the average length of a shorter planar portion between two adjacent planar portions with the bent portion therebetween.

In addition, the average value of Dl is the average value of Dl on the inner side and Dl on the outer side of one planar portion between two planar portions and Dl on the inner side and Dl on the outer side of the other planar portion.

In addition, still another embodiment of the present invention provides a wound core including a wound core main body obtained by stacking a plurality of polygonal annular grain-oriented electrical steel sheets in a sheet thickness direction in a side view, wherein the grain-oriented electrical steel sheet has planar portions and bent portions that are alternately continuous in a longitudinal direction, the bent portion in a side view has an inner radius of curvature r of 1 mm or more and 5 mm or less, the grain-oriented electrical steel sheet has a chemical composition containing, in mass %, Si: 2.0 to 7.0%, with the remainder being Fe and impurities, and has a texture oriented in the Goss orientation, and in at least one of the bent portions, the crystal grain size Dpz (mm) of the stacked grain-oriented electrical steel sheet is FL/4 or more.

Here, Dpz (mm) is the average value of Dc (mm),

Dc (mm) is the average crystal grain size in a boundary direction at respective boundaries between the bent portion and two planar portions arranged with the bent portion therebetween, and FL (mm) is the average length of a shorter planar portion between two adjacent planar portions with the bent portion therebetween.

In addition, the average value of Dc is the average value of Dc on the inner side and Dc on the outer side of one planar portion between two planar portions and Dc on the inner side and Dp on the outer side of the other planar portion.

Effects of the Invention

According to the present invention, in the wound core formed by stacking the bent grain-oriented electrical steel sheets, it is possible to effectively minimize the generation of unintentional noise.

EMBODIMENT(S) FOR IMPLEMENTING THE INVENTION

Figure 1:
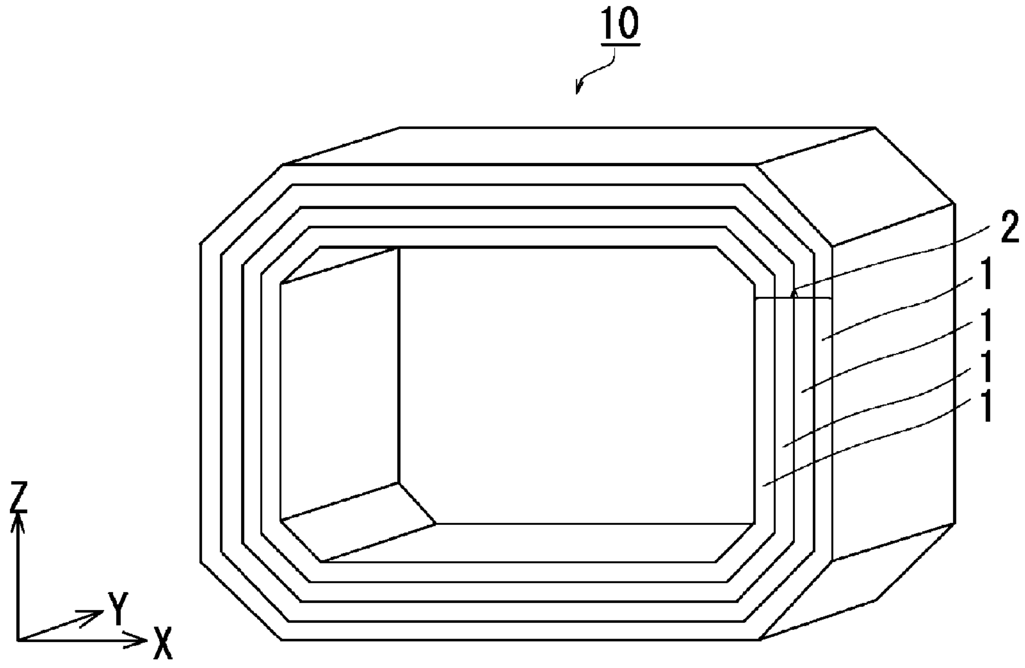
FIG. 1 is a perspective view schematically showing a wound core according to one embodiment of the present invention.

Hereinafter, a wound core according to one embodiment of the present invention will be described in detail in order. However, the present invention is not limited to only the configuration disclosed in the present embodiment, and can be variously modified without departing from the gist of the present invention. Here, lower limit values and upper limit values are included in the numerical value limiting ranges described below. Numerical values indicated by "more than" or "less than" are not included in these numerical value ranges. In addition, unless otherwise specified, "%" relating to the chemical composition means "mass %."

In addition, terms such as "parallel," "perpendicular," "identical," and "right angle" and length and angle values used in this specification to specify shapes, geometric conditions and their extents are not bound by strict meanings, and should be interpreted to include the extent to which similar functions can be expected.

In addition, in this specification, "grain-oriented electrical steel sheet" may be simply described as "steel sheet" or "electrical steel sheet" and "wound core" may be simply described as "iron core."

A wound core according to the present embodiment is a wound core including a wound core main body obtained by stacking a plurality of polygonal annular grain-oriented electrical steel sheets in a sheet thickness direction in a side view,

- wherein the grain-oriented electrical steel sheet has planar portions and bent portions that are alternately continuous in a longitudinal direction,
- the bent portion in a side view has an inner radius of curvature r of 1 mm or more and 5 mm or less,
- the grain-oriented electrical steel sheet has a chemical composition containing,
- in mass %,
- Si: 2.0 to 7.0%, with the remainder being Fe and impurities, and
- has a texture oriented in the Goss orientation, and
- in at least one of the bent portions, the crystal grain size Dpx (mm) of the stacked grain-oriented electrical steel sheet is FL/4 or more.

Here, Dpx (mm) is the average value of Dp obtained by the following Formula (1),

- Dc (mm) is the average crystal grain size in a boundary direction at respective boundaries between the bent portion and two planar portions arranged with the bent portion therebetween,
- Dl (mm) is the average crystal grain size in a direction perpendicular to the boundary direction, and
- FL (mm) is the average length of the planar portion.

In addition, the average value of Dp is the average value of Dp on the inner side and Dp on the outer side of one planar portion between two planar portions and Dp on the inner side and Dp on the outer side of the other planar portion.

$$Dp=\sqrt{(Dc\times Dl/\pi)} \quad (1)$$

1. Shape of Wound Core and Grain-Oriented Electrical Steel Sheet

First, the shape of a wound core of the present embodiment will be described. The shapes themselves of the wound core and the grain-oriented electrical steel sheet described here are not particularly new. For example, they merely correspond to the shapes of known wound cores and grain-oriented electrical steel sheets introduced in Patent Documents 9 to 11 in the related art.

Figure 2:
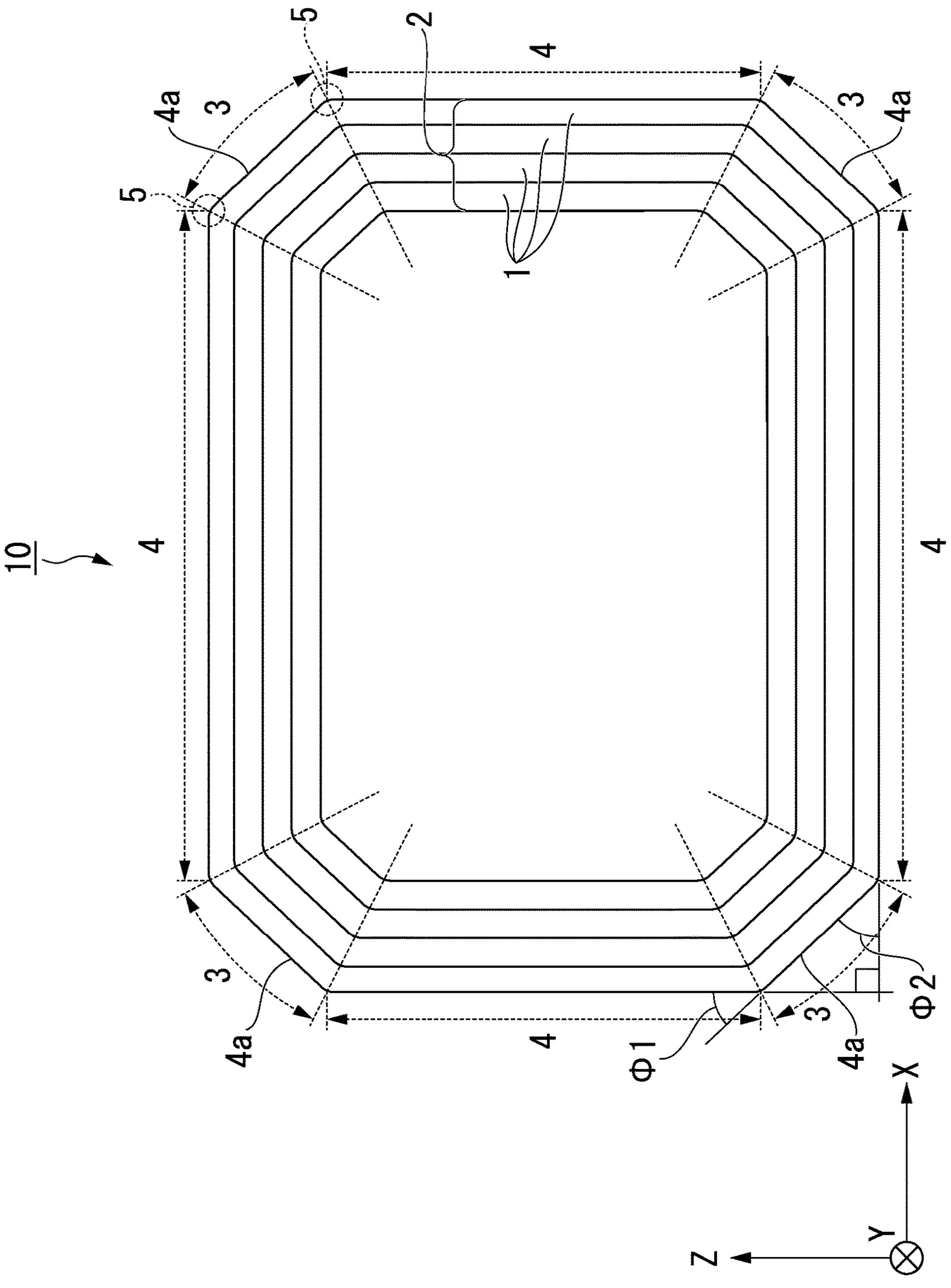
FIG. 2 is a side view of the wound core shown in the embodiment of FIG. 1.
Figure 3:
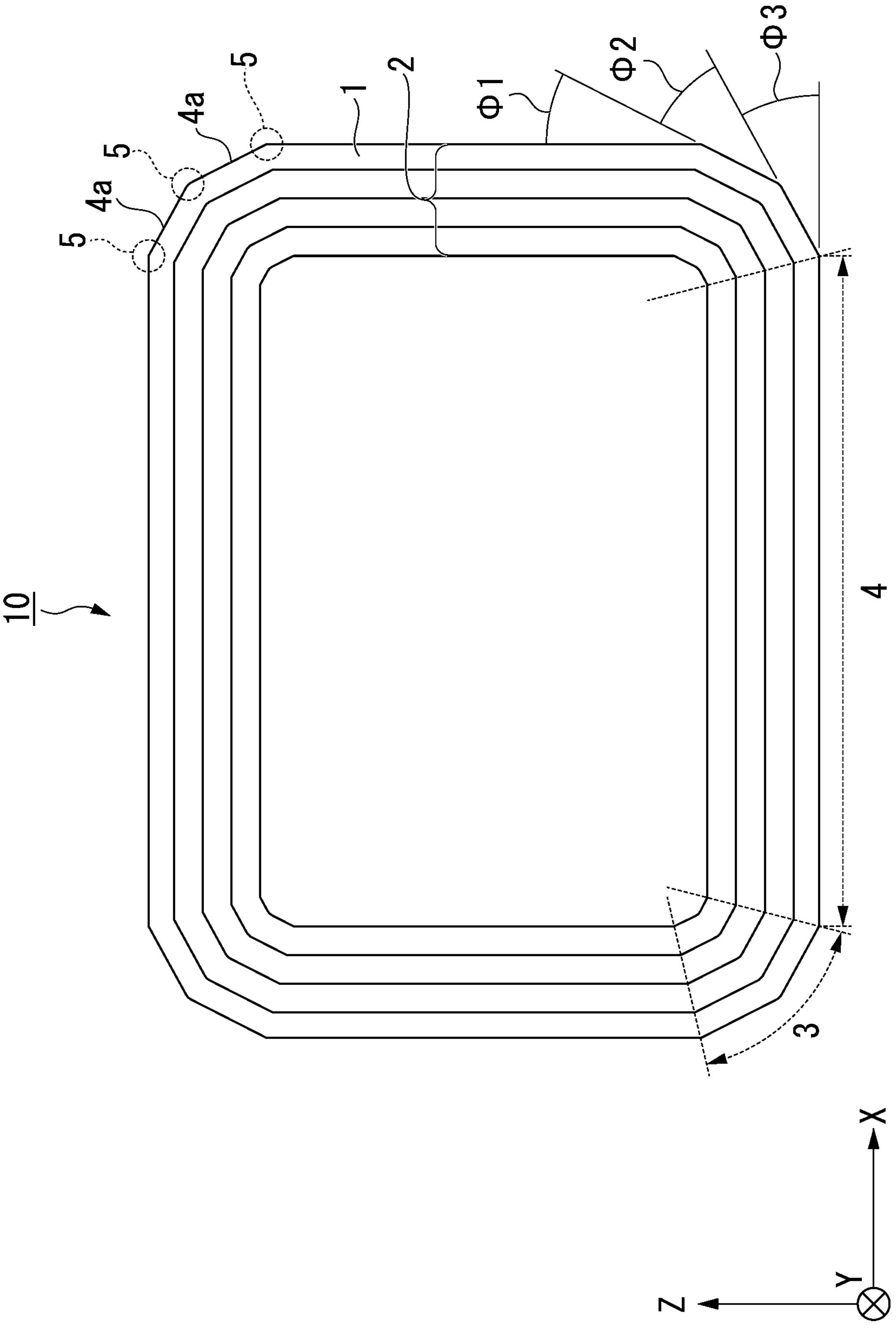
FIG. 3 is a side view schematically showing a wound core according to another embodiment of the present invention.

FIG. 1 is a perspective view schematically showing a wound core according to one embodiment. FIG. 2 is a side view of the wound core shown in the embodiment of FIG. 1. In addition, FIG. 3 is a side view schematically showing another embodiment of the wound core.

Here, in the present embodiment, the side view is a view of the long-shaped grain-oriented electrical steel sheet constituting the wound core in the width direction (Y-axis direction in FIG. 1). The side view is a view showing a shape visible from the side (a view in the Y-axis direction in FIG. 1).

The wound core according to the present embodiment includes a wound core main body 10 in a side view in which a plurality of polygonal annular (rectangular or polygonal) grain-oriented electrical steel sheets 1 are stacked in a sheet thickness direction. The wound core main body 10 has a polygonal laminated structure 2 in a side view in which the grain-oriented electrical steel sheets 1 are stacked in a sheet thickness direction. The wound core main body 10 may be used as a wound core without change or may include, as necessary, for example, a known fastener such as a binding band for integrally fixing the plurality of stacked grain-oriented electrical steel sheets 1.

In the present embodiment, the iron core length of the wound core main body 10 is not particularly limited. Even if the iron core length of the iron core changes, because the volume of a bent portion 5 is constant, the iron loss generated in the bent portion 5 is constant. If the iron core length is longer, the volume ratio of the bent portion 5 to the wound core main body 10 is smaller and the influence on iron loss deterioration is also small. Therefore, a longer iron core length of the wound core main body 10 is preferable. The iron core length of the wound core main body 10 is preferably 1.5 m or more and more preferably 1.7 m or more. Here, in the present embodiment, the iron core length of the wound core main body 10 is the circumferential length at the central point in the stacking direction of the wound core main body 10 in a side view.

In addition, in the present embodiment, the thickness of the wound core main body 10, that is, the total thickness of the stacked steel sheets (steel sheet stacking thickness), is not particularly limited. However, as will be described below, the noise is considered to be caused by uneven distribution of the excitation magnetic flux in the iron core that depends on the steel sheet stacking thickness to the center region of the iron core, and thus it can be said that the effect of the present embodiment, that is, noise reduction, can be more easily exhibited in an iron core with a thick steel sheet stacking thickness in which the uneven distribution easily occurs. Therefore, the steel sheet stacking thickness is preferably 40 mm or more and more preferably 50 mm or more. Here, in the present embodiment, the steel sheet stacking thickness of the wound core main body 10 is the maximum thickness of the planar portion of the wound core main body in a side view in the stacking direction.

The wound core of the present embodiment can be suitably used for any conventionally known application. Particularly, when it is applied to the iron core for a transmission transformer in which noise is a problem, significant advantages can be exhibited.

As shown in FIGS. 1 and 2, the wound core main body 10 includes a portion in which the grain-oriented electrical steel sheets 1 in which first planar portions 4 and corner portions 3 are alternately continuous in the longitudinal direction and the angle formed by two adjacent first planar portions 4 at each corner portion 3 is 90° are stacked in a sheet thickness direction and has a substantially rectangular laminated structure 2 in a side view. In addition, from another point of view, the wound core main body 10 shown in FIGS. 1 and 2 has an octagonal laminated structure 2. The wound core main body 10 according to the present embodiment has an octagonal laminated structure, but the present invention is not limited thereto, and in the wound core main body, in a side view, a plurality of polygonal annular grain-oriented electrical steel sheets are stacked in a sheet thickness direction, and in the grain-oriented electrical steel sheets, planar portions and bent portions may be alternately continuous in the longitudinal direction (the circumferential direction).

Hereinafter, the wound core main body 10 having substantially a rectangular shape including four corner portions 3 will be described.

Each corner portion 3 of the grain-oriented electrical steel sheet 1 in a side view includes two or more bent portions 5 having a curved shape and a second planar portion **4*a* between the adjacent bent portions 5 and 5. Therefore, the corner portion 3 has a configuration including two or more bent portions 5 and one or more second planar portions 4*a*. In addition, the sum of the bent angles of two bent portions 5 and 5 present in one corner portion 3** is 90°.

In addition, as shown in FIG. 3, each corner portion 3 of the grain-oriented electrical steel sheet 1 in a side view includes three bent portions 5 having a curved shape and the second planar portion **4*a* between the adjacent bent portions 5 and 5 and the sum of the bent angles of three bent portions, 5, 5 and 5 present in one corner portion 3** is 90°.

In addition, each corner portion 3 may include four or more bent portions. In this case also, the second planar portion **4*a* is provided between the adjacent bent portions 5 and 5, and the sum of the bent angles of four or more bent portions 5 present in one corner portion 3 is 90°. That is, the corner portions 3 according to the present embodiment are arranged between two adjacent first planar portions 4 and 4 arranged at right angles and include two or more bent portions 5 and one or more second planar portions 4*a***.

In addition, in the wound core main body 10 shown in FIG. 2, the bent portion 5 is arranged between the first planar portion 4 and the second planar portion **4*a*, but in the wound core main body 10 shown in FIG. 3, the bent portion 5 is arranged between the first planar portion 4 and the second planar portion 4*a* and between two second planar portions 4*a* and 4*a*. That is, the second planar portion 4*a* may be arranged between two adjacent second planar portions 4*a* and 4*a***.

In addition, in the wound core main body 10 shown in FIG. 2 and FIG. 3, the first planar portion 4 has a longer length than the second planar portion **4*a* in the longitudinal direction (the circumferential direction of the wound core main body 10), but the first planar portion 4 and the second planar portion 4*a*** may have the same length.

Here, in this specification, "first planar portion" and "second planar portion" may each be simply referred to as "planar portion."

Each corner portion 3 of the grain-oriented electrical steel sheet 1 in a side view includes two or more bent portions 5 having a curved shape, and the sum of the bent angles of the bent portions present in one corner portion is 90°. The corner portion 3 includes the second planar portion **4*a* between the adjacent bent portions 5 and 5. Therefore, the corner portion 3 has a configuration including two or more bent portions 5 and one or more second planar portions 4*a***.

The embodiment of FIG. 2 includes two bent portions 5 in one corner portion 3. The embodiment of FIG. 3 includes three bent portions 5 in one corner portion 3.

As shown in these examples, in the present embodiment, one corner portion can be formed with two or more bent portions, but in order to minimize the occurrence of distortion due to deformation during processing and minimize the iron loss, the bent angle φ (φ1, φ2, φ3) of the bent portion 5 is preferably 600 or less and more preferably 45° or less.

In the embodiment of FIG. 2 including two bent portions in one corner portion, in order to reduce the iron loss, for example, φ1=60° and φ2=30° and φ1=45° and φ2=45° can be set. In addition, in the embodiment of FIG. 3 including three bent portions in one corner portion, in order to reduce the iron loss, for example, φ1=30°, φ2=30° and φ3=30° can be set. In addition, in consideration of production efficiency, since it is preferable that folding angles (bent angles) be equal, when one corner portion includes two bent portions, φ1=45° and φ2=45° are preferable. In addition, in the embodiment of FIG. 3 including three bent portions in one corner portion, in order to reduce the iron loss, for example, φ1=30°, φ2=30° and φ3=30° are preferable.

Figure 6:
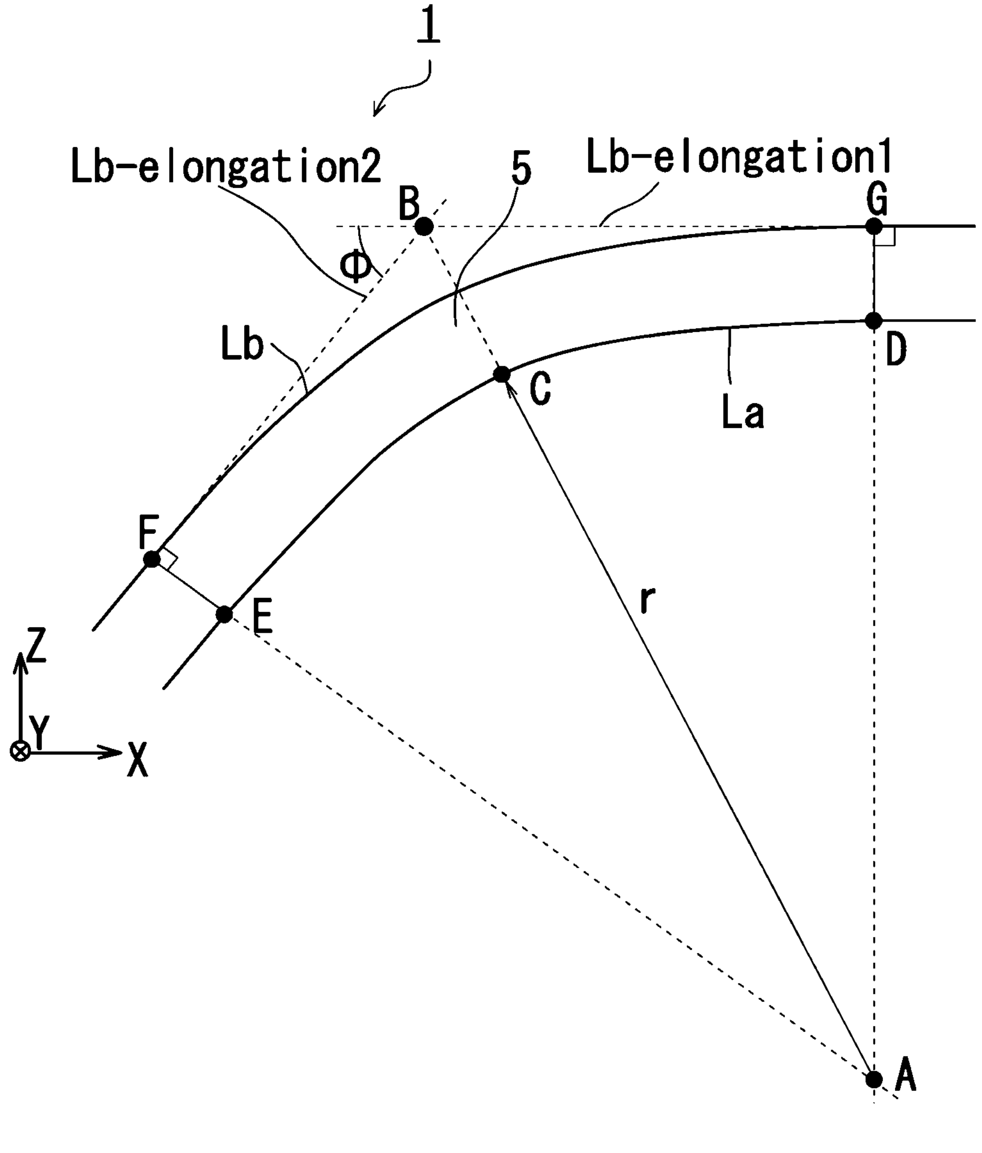
FIG. 6 is a side view schematically showing an example of a bent portion of a grain-oriented electrical steel sheet constituting the wound core according to the present invention.

The bent portion 5 will be described in more detail with reference to FIG. 6. FIG. 6 is a diagram schematically showing an example of the bent portion (curved portion) of the grain-oriented electrical steel sheet. The bent angle of the bent portion 5 is the angle difference occurring between the rear straight portion and the front straight portion in the bending direction at the bent portion 5 of the grain-oriented electrical steel sheet 1, and is expressed, on the outer surface of the grain-oriented electrical steel sheet 1, as an angle φ that is a supplementary angle of the angle formed by two virtual lines Lb-elongation1 and Lb-elongation2 obtained by extending the straight portion that are surfaces of the planar portions 4 and **4*a* on both sides of the bent portion 5. In this case, the point at which the extended straight line separates from the surface of the steel sheet is the boundary between the planar portions 4 and 4*a* and the bent portion 5 on the outer surface of the steel sheet, which is the point F and the point G in FIG. 6**.

In addition, straight lines perpendicular to the outer surface of the steel sheet extend from the point F and the point G, and intersections with the inner surface of the steel sheet are the point E and the point D. The point E and the point D are the boundaries between the planar portions 4 and **4*a* and the bent portion 5** on the inner surface of the steel sheet.

Here, in the present embodiment, in a side view of the grain-oriented electrical steel sheet 1, the bent portion 5 is a portion of the grain-oriented electrical steel sheet 1 surrounded by the point D, the point E, the point F, and the point G. In FIG. 6, the surface of the steel sheet between the point D and the point E, that is, the inner surface of the bent portion 5, is indicated by La, and the surface of the steel sheet between the point F and the point G, that is, the outer surface of the bent portion 5, is indicated by Lb.

In addition, FIG. 6 shows the inner radius of curvature r (hereinafter simply referred to as a radius of curvature r) of the bent portion 5 in a side view. The radius of curvature r of the bent portion 5 is obtained by approximating the above La with an arc passing through the point E and the point D. A smaller radius of curvature r indicates a sharper curvature of the curved portion of the bent portion 5, and a larger radius of curvature r indicates a gentler curvature of the curved portion of the bent portion 5.

In the wound core of the present embodiment, the radius of curvature r at each bent portion 5 of the grain-oriented electrical steel sheets 1 stacked in the sheet thickness direction may vary to some extent. This variation may be a variation due to molding accuracy, and it is conceivable that an unintended variation may occur due to handling during lamination. Such an unintended error can be minimized to about 0.2 mm or less in current general industrial production. If such a variation is large, a representative value can be obtained by measuring the curvature radii of a sufficiently large number of steel sheets and averaging them. In addition, it is conceivable to change it intentionally for some reason, but the present embodiment does not exclude such a form.

In addition, the method of measuring the inner radius of curvature r of the bent portion 5 is not particularly limited, and for example, the inner radius of curvature r can be measured by performing observation using a commercially available microscope (Nikon ECLIPSE LV150) at a magnification of 200. Specifically, the curvature center point A as shown in FIG. 6 is obtained from the observation result, and for a method of obtaining this, for example, if the intersection of the line segment EF and the line segment DG extended inward on the side opposite to the point B is defined as A, the magnitude of the inner radius of curvature r corresponds to the length of the line segment AC. Here, when the point A and the point B are connected by a straight line, the intersection on an arc DE inner the bent portion 5 is the point C.

In the present embodiment, when the inner radius of curvature r of the bent portion 5 is in a range of 1 mm or more and 5 mm or less and specific grain-oriented electrical steel sheets with a controlled crystal grain size, which will be described below, are used to form a wound core, it is possible to reduce noise of the wound core. The inner radius of curvature r of the bent portion 5 is preferably 3 mm or less. In this case, the effects of the present embodiment are more significantly exhibited.

In addition, it is most preferable that all bent portions present in the iron core satisfy the inner radius of curvature r specified in the present embodiment. If there are bent portions that satisfy the inner radius of curvature r of the present embodiment and bent portions that do not satisfy the inner radius of curvature r in the wound core, it is desirable for at least half or more of the bent portions to satisfy the inner radius of curvature r specified in the present embodiment.

Figure 4:
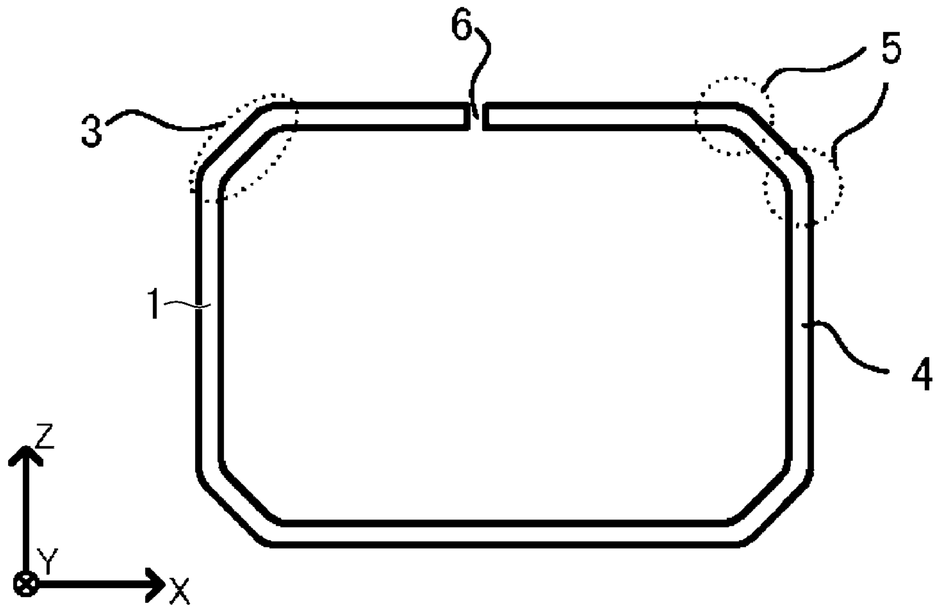
FIG. 4 is a side view schematically showing an example of a single-layer grain-oriented electrical steel sheet constituting a wound core according to the present invention.
Figure 5:
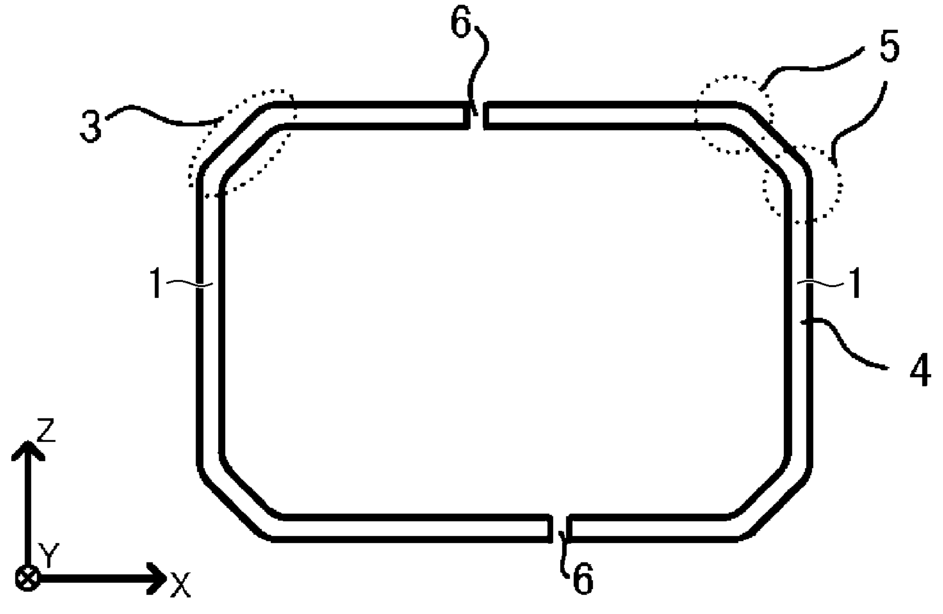
FIG. 5 is a side view schematically showing another example of a single-layer grain-oriented electrical steel sheet constituting the wound core according to the present invention.

FIG. 4 and FIG. 5 are diagrams schematically showing an example of a single-layer grain-oriented electrical steel sheet 1 in the wound core main body 10. As shown in the examples of FIG. 4 and FIG. 5, the grain-oriented electrical steel sheet 1 used in the present embodiment is bent and includes the corner portion 3 composed of two or more bent portions 5 and the first planar portion 4, and forms a substantially rectangular ring in a side view via a joining part 6 that is an end surface of one or more grain-oriented electrical steel sheets 1 in the longitudinal direction.

In the present embodiment, the entire wound core main body 10 may have a substantially rectangular laminated structure 2 in a side view. As shown in the example of FIG. 4, one grain-oriented electrical steel sheet 1 may form one layer of the wound core main body 10 via one joining part 6 (that is, one grain-oriented electrical steel sheet 1 is connected via one joining part 6 for each roll), and as shown in the example of FIG. 5, one grain-oriented electrical steel sheet 1 may form about half the circumference of the wound core, or two grain-oriented electrical steel sheets 1 may form one layer of the wound core main body 10 via two joining parts 6 (that is, two grain-oriented electrical steel sheets 1 are connected to each other via two joining parts 6 for each roll).

The sheet thickness of the grain-oriented electrical steel sheet 1 used in the present embodiment is not particularly limited, and may be appropriately selected according to applications and the like, but is generally within a range of 0.15 mm to 0.35 mm and preferably in a range of 0.18 mm to 0.23 mm.

2. Configuration of Grain-Oriented Electrical Steel Sheet

Next, the Configuration of the Grain-Oriented Electrical Steel Sheet 1 constituting the wound core main body 10 will be described. The present embodiment has features such as the crystal grain size of the planar portions 4 and **4*a* adjacent to the bent portion 5** of the grain-oriented electrical steel sheets stacked adjacently and the arrangement portion of the grain-oriented electrical steel sheet with a controlled crystal grain size in the wound core.

(1) Crystal Grain Size of Planar Portion Adjacent to Bent Portion

In the grain-oriented electrical steel sheet 1 constituting the wound core of the present embodiment, in at least a part of the corner portion, the crystal grain size of the stacked steel sheets is controlled such that it becomes larger. If the crystal grain size in the vicinity of the bent portion 5 becomes fine, a noise reduction effect in the iron core having an iron core shape in the present embodiment is not exhibited. In other words, when there are crystal grain boundaries in the vicinity of the bent portion 5, noise tends to increase. From the opposite point of view, noise can be reduced by arranging crystal grain boundaries far away from the bent portion 5.

Although a mechanism by which such a phenomenon occurs is not clear, it is speculated to be as follows.

The wound core targeted by the present embodiment has a structure in which bent portions limited to very narrow regions and planar portions, which are relatively wide regions compared to the bent portions 5, are alternately arranged. Since the bent portions are bent with a small radius of curvature r, the vibration is likely to be limited by expansion and contraction of the steel sheet caused by magneto-striction of the grain-oriented electrical steel sheet. In addition, in the planar portion (the above first planar portion 4) between relatively wide corner portions among the planar portions, coils, fastening tools and the like are arranged particularly in the center region of the planar portion so that the stacked steel sheets are strongly restrained, and thereby the vibration tends to be limited. On the other hand, the planar portion present in the corner portion (the above second planar portion **4*a*) and the planar portion close to the corner portion (both ends of the above first planar portion 4 in the longitudinal direction (both ends adjacent to the bent portion 5**)) are likely to have gaps due to stacking accuracy, and are speculated to be portions in which vibration caused by magneto-striction tends to increase.

In addition, regarding crystal grain boundaries, it is generally known that closure domains tend to occur in the vicinity of crystal grain boundaries, and their presence particularly increases magneto-striction during elongation. In addition, it is considered that the region including the closure domain expands due to the influence of strain, which increases noise.

It is thought that, in the region in which there are many gaps between stacked steel sheets, which tend to occur in the vicinity of the bent portion, that is, the region in which there is no restraint against out-of-plane movement of grain-oriented electrical steel sheets, if magneto-striction during elongation due to the closure domain increases, the steel sheets vibrate out of the plane and noise increases. Therefore, as specified in the present embodiment, control of the distance between the bent portion and the crystal grain boundary is effective for noise. Such a mechanism of operation of the present embodiment is considered to be a special phenomenon in the iron core having a specific shape targeted by the present embodiment, and has so far hardly been considered, but can be interpreted according to the findings obtained by the inventors.

In the present embodiment, the crystal grain size is measured as follows.

Figure 7:
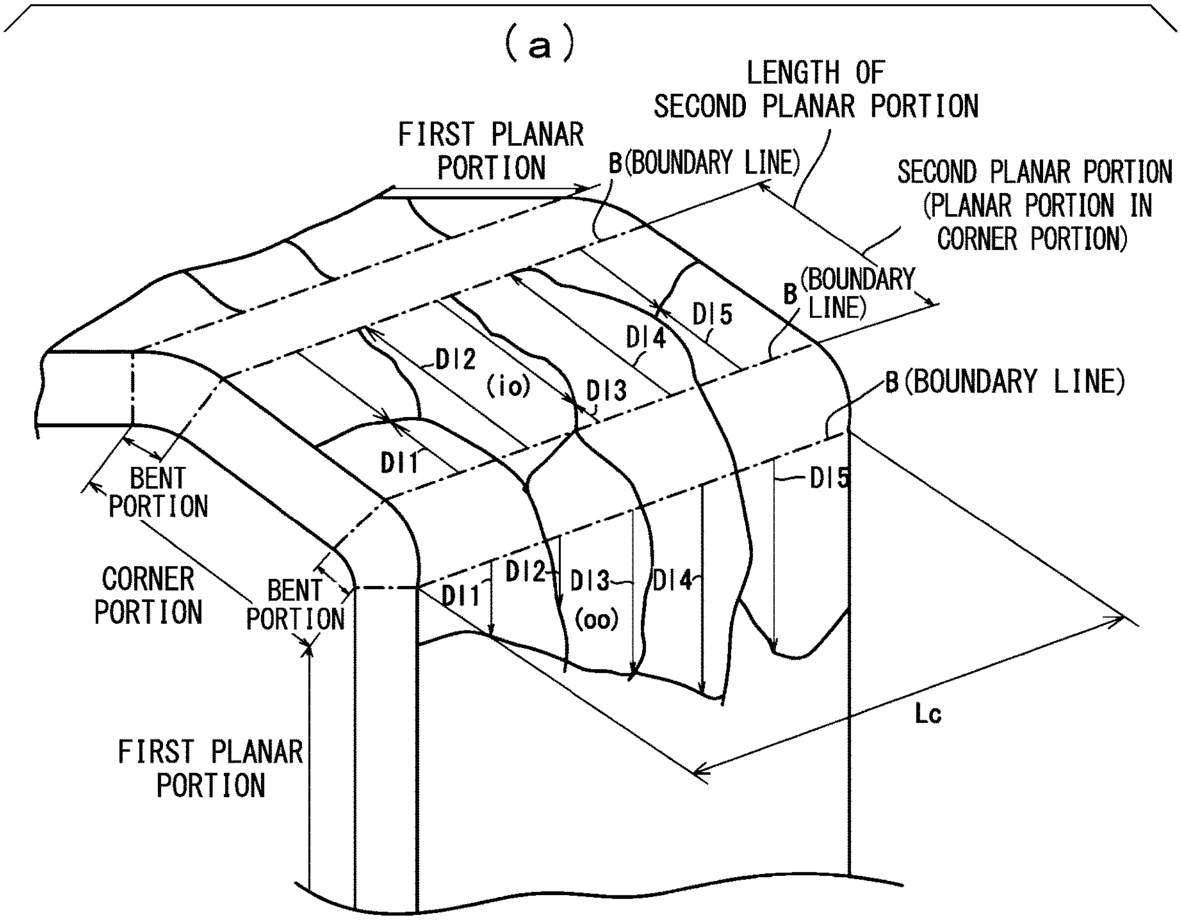
FIG. 7 is a schematic view showing a method of measuring a crystal grain size of a grain-oriented electrical steel sheet constituting the wound core according to the present invention.
Figure 7:
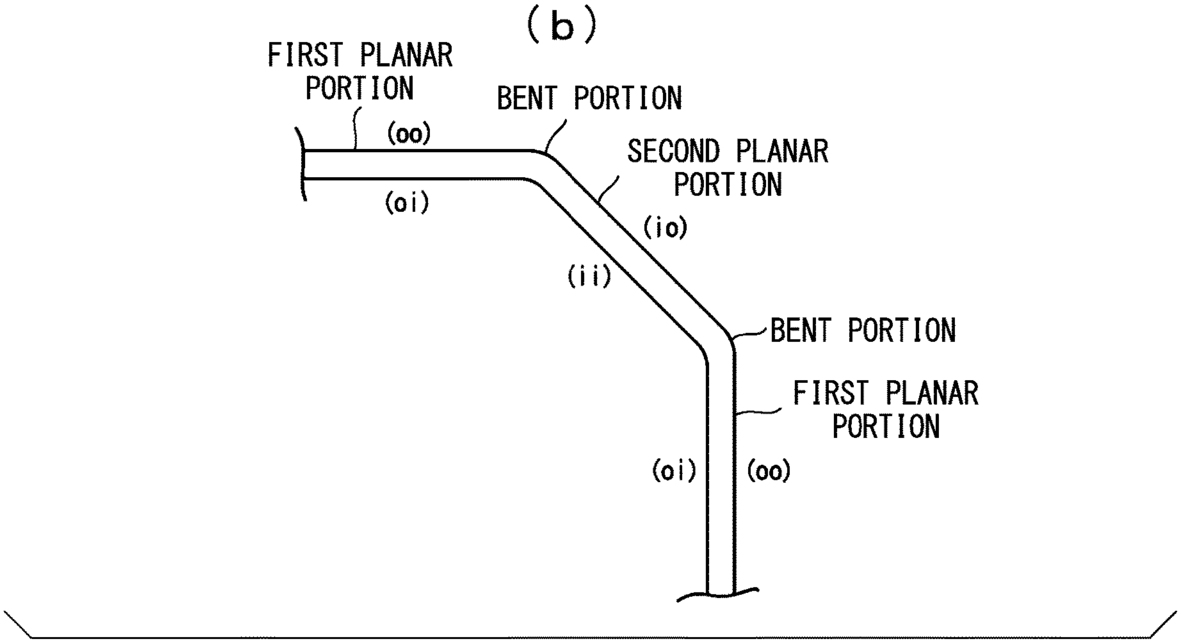

When the steel sheet stacking thickness of the wound core main body 10 is T (corresponding to "L3" shown in FIG. 8), a total of 5 grain-oriented electrical steel sheets stacked at positions of every T/4 including the innermost surface are extracted from the innermost surface of the region including a corner portion of the wound core main body 10. For each of the extracted grain-oriented electrical steel sheets, if a primary coating made of an oxide or the like (a glass film and an intermediate layer), an insulation coating or the like is provided on the surface of the steel sheet, this coating is removed by a known method, and then as shown in FIG. 7(*a*), the crystal structure of the inner side surface and the outer side surface of the steel sheet is visually observed. Then, at the boundary line B between the bent portion and the planar portion, which is a substantially straight line on each surface, the particle size in the boundary direction (the direction in which the boundary line B extends (C direction of the grain-oriented electrical steel sheet)) and the particle size in the direction perpendicular to the boundary (boundary vertical direction (L direction of the grain-oriented electrical steel sheet)) are measured as follows.

The particle size Dc (mm) in the boundary direction is, for example, as shown in a schematic view of FIG. 7(*a*), obtained by the following Formula (2) when the length of the boundary line B (corresponding to the width of the grain-oriented electrical steel sheet 1 constituting a wound core) is Le and the number of crystal grain boundaries intersecting the boundary line B is Nc.

$$Dc = Lc/(Nc+1) \tag{2}$$

In addition, for the particle size Dl (mm) in the boundary vertical direction (the direction perpendicular to the boundary direction), in the extension direction of the boundary line B (boundary direction), at five locations excluding the end among positions obtained by dividing Lc into six, distances from the boundary line B between one bent portion 5 and the first planar portion 4 as a starting point until the line extending perpendicular to the boundary line B in a direction of the region of the first planar portion 4 first intersect the crystal grain boundary are defined as Dl1 to Dl5 in the first planar portion 4. In addition, distances from the boundary line B between one bent portion 5 and the second planar portion (planar portion in the corner portion) 4*a* as a starting point until the line extending perpendicular to the boundary line B in a direction of the region of the second planar portion 4*a* first intersects the boundary line B between other adjacent bent portions 5 with the crystal grain boundary or the second planar portion 4*a* therebetween are defined as Dl1 to Dl5 in the second planar portion 4*a*. For the other bent portion 5, similarly, Dl1 to Dl5 in the first planar portion 4 and the second planar portion 4*a* are obtained. Then, the particle size Dl (mm) in the boundary vertical direction is obtained as the average distance of Dl1 to Dl5.

In addition, the circle-equivalent crystal grain size Dp (mm) of the first planar portion 4 and the second planar portion 4*a* adjacent to the bent portion 5 is obtained by the following Formula (1).

$$Dp = \sqrt{(Dc \times Dl/\pi)} \tag{1}$$

In addition, as shown in the schematic view of FIG. 7(*b*), the suffix ii indicates the crystal grain size on the inner side of the second planar portion 4*a*, the suffix io indicates the crystal grain size on the outer side thereof, the suffix oi indicates the crystal grain size on the inner side of the first planar portion 4, and the suffix oo indicates the crystal grain size on the outer side thereof. In this manner, for one bent portion 5, 12 crystal grain sizes (Dcii, Dcio, Dcoi, Dcoo, Dlii, Dlio, Dloi, Dloo, Dpii, Dpio, Dpoi, Dpoo) such as (Dc, Dl, Dp)−(ii, io, oi, oo) are determined. Thus, for two or more bent portions 5 present in each corner portion (for example, two bent portions in the wound core main body 10 shown in FIG. 2 and three bent portions in the wound core main body 10 shown in FIG. 3), the above 12 crystal grain sizes are averaged, and for each corner portion, 12 crystal grain sizes such as (Dc, Dl, Dp)−(ii, io, oi, oo) are determined.

In the present embodiment, these crystal grain sizes are defined by comparison with the average length of the planar portion with a shorter length between two adjacent planar portions with the bent portion 5 therebetween. In the present embodiment, between two adjacent planar portions with the bent portion 5 therebetween, the planar portion with a shorter length is the second planar portion 4*a* present in the corner portion and therefore 12 crystal grain sizes such as (Dc, Dl, Dp)−(ii, io, oi, oo) are defined by comparison with the average length FL of the second planar portion 4*a*.

The average length FL (mm) of the second planar portion 4*a* present in the corner portion is obtained as follows.

When there are N bent portions 5 in the corner portion, the boundary on the side of the first planar portion 4 of the bent portion positioned at the corner portion end among N bent portions 5 is the boundary between the corner portion and the first planar portion 4. That is, in the corner portion, the bent portions 5 and the second planar portions 4*a* are alternately formed from one corner portion boundary toward the other corner portion boundary. That is, the number of second planar portions 4*a* in the corner portion is (N−1). In addition, in the corner portion, the length of the second planar portion 4*a* in the corner portion generally differs depending on the position in the stacking thickness direction. That is, the shape of the iron core is often designed so that the length of the second planar portion 4*a* increases toward the outer periphery side.

In consideration of such a situation, in the present embodiment, for samples collected for measurement of the crystal grain size described above, the average length FL of the second planar portion 4*a* present in the corner portion is obtained by dividing the sum of the lengths of all second planar portions 4*a* in one corner portion by the number thereof. For example, when there are two bent portions 5 in the corner portion, since the second planar portion 4*a* in the corner portion becomes one region interposed between the bent portions 5, the length thereof is the average length of the second planar portion in the corner portion for that sample. When there are three bent portions 5 in the corner portion, since the second planar portion 4*a* in the corner portion has two regions interposed between the bent portions 5, the lengths are averaged to obtain the average length of the second planar portions in the corner portion for that sample. Furthermore, as described above, total lengths of the second planar portions in the corner portion for a total of 5 samples (grain-oriented electrical steel sheet) stacked at positions of every T/4 including the innermost surface are averaged, the average length for each sample is calculated, the average lengths of the second planar portions of all samples are additionally averaged, and thus the average length FL of all second planar portions present in the corner portion is obtained.

In one embodiment of the present embodiment, in at least one corner portion 3, $Dpx \geq FL/4$, where Dpx is the average value of Dp−(ii, io, oi, oo). This expression corresponds to the basic feature of the mechanism described above. When this expression is satisfied, it is possible to sufficiently increase the distance between the crystal grain boundary and the bent portion 5. As a result, it is possible to efficiently minimize the generation of noise. Preferably, $Dpx \geq FL/2$. In addition, in all of four corner portions present in the wound core main body 10, it is needless to say that it is preferable to satisfy $Dpx \geq FL/4$.

As another embodiment, in at least one corner portion 3, $Dpy \geq FL/4$, where Dpy is the average value of Dl−(ii, io, oi, oo). This expression corresponds to a feature in which the mechanism described above is particularly easily influenced by crystal grain boundaries present in the first planar portion 4 and the second planar portion **4*a*. When this expression is satisfied, it is possible to sufficiently increase the distance between the crystal grain boundary and the bent portion 5 in the first planar portion 4 and the second planar portion 4*a*. As a result, it is possible to efficiently minimize the generation of noise. Preferably, $Dpy \geq FL/2$. In addition, in all of four corner portions present in the wound core main body 10**, it is needless to say that it is preferable to satisfy $Dpy \geq FL/4$.

As another embodiment, in at least one corner portion 3, $Dpz \geq FL/4$, where Dpz is the average value of Dc−(ii, io, oi, oo). This expression corresponds to a feature in which the mechanism described above is particularly easily influenced by crystal grain boundaries present in the second planar portion **4*a* in the corner portion and additionally easily influenced by crystal grain boundaries (crystal grain size in the L direction of the grain-oriented electrical steel sheet) present parallel to the boundary of the bent portion 5. When this expression is satisfied, it is possible to sufficiently increase the vertical distance between the crystal grain boundary and the bent portion boundary in the second planar portion 4*a* in the corner portion. As a result, it is possible to efficiently minimize the generation of noise. Preferably, $Dpz = FL/2$. In addition, in all of four corner portions present in the wound core main body 10**, it is needless to say that it is preferable to satisfy $Dpz \geq FL/4$.

(2) Grain-Oriented Electrical Steel Sheet

As described above, in the grain-oriented electrical steel sheet 1 used in the present embodiment, the base steel sheet is a steel sheet in which crystal grain orientations in the base steel sheet are highly concentrated in the {110}<001> orientation and has excellent magnetic properties in the rolling direction.

A known grain-oriented electrical steel sheet can be used as the base steel sheet in the present embodiment. Hereinafter, an example of a preferable base steel sheet will be described.

The base steel sheet has a chemical composition containing, in mass %, Si: 2.0% to 6.0%, with the remainder being Fe and impurities. This chemical composition allows the crystal orientation to be controlled to the Goss texture concentrated in the {110}<001> orientation and favorable magnetic properties to be secured. Other elements are not particularly limited, but in the present embodiment, in addition to Si, Fe and impurities, elements may be contained as long as the effects of the present invention are not impaired. For example, it is allowed to contain the following elements in the following ranges in place of some Fe. The ranges of the amounts of representative selective elements are as follows.

C: 0 to 0.0050%,
Mn: 0 to 1.0%,
S: 0 to 0.0150%,
Se: 0 to 0.0150%,
Al: 0 to 0.0650%,
N: 0 to 0.0050%,
Cu: 0 to 0.40%,
Bi: 0 to 0.010%,
B: 0 to 0.080%,
P: 0 to 0.50%,
Ti: 0 to 0.0150%,
Sn: 0 to 0.10%,
Sb: 0 to 0.10%,
Cr: 0 to 0.30%,
Ni: 0 to 1.0%,
Nb: 0 to 0.030%,
V: 0 to 0.030%,
Mo: 0 to 0.030%,
Ta: 0 to 0.030%,
W: 0 to 0.030%.

Since these selective elements may be contained depending on the purpose, there is no need to limit the lower limit value, and it is not necessary to substantially contain them. In addition, even if these selective elements are contained as impurities, the effects of the present embodiment are not impaired. In addition, since it is difficult to make the C content 0% in a practical steel sheet in production, the C content may exceed 0%. Here, impurities refer to elements that are unintentionally contained, and elements that are mixed in from raw materials such as ores, scraps, or production environments when the base steel sheet is industrially produced. The upper limit of the total amount of impurities may be, for example, 5%.

The chemical component of the base steel sheet may be measured by a general analysis method for steel. For example, the chemical component of the base steel sheet may be measured using Inductively Coupled Plasma-Atomic Emission Spectrometry (ICP-AES). Specifically, for example, a 35 mm square test piece is acquired from the center position of the base steel sheet after the coating is removed, and it can be specified by performing measurement under conditions based on a previously created calibration curve using ICPS-8100 or the like (measurement device) (commercially available from Shimadzu Corporation). Here, C and S may be measured using a combustion-infrared absorption method, and N may be measured using an inert gas fusion-thermal conductivity method.

Here, the above chemical composition is the component of the grain-oriented electrical steel sheet 1 as a base steel sheet. When the grain-oriented electrical steel sheet 1 as a measurement sample has a primary coating made of an oxide or the like (a glass film and an intermediate layer), an insulation coating or the like on the surface, this coating is removed by a known method and the chemical composition is then measured.

(3) Method of Producing Grain-Oriented Electrical Steel Sheet

The method of producing a grain-oriented electrical steel sheet is not particularly limited, and as will be described below, when production conditions are precisely controlled, the crystal grain size of the steel sheet can be incorporated. When grain-oriented electrical steel sheets having such a desired crystal grain size are used and a wound core is produced under suitable processing conditions to be described below, it is possible to obtain a wound core that can minimize the generation of noise. As a preferable specific example of the production method, for example, first, a slab containing 0.04 to 0.1 mass % of C, with the remainder being the chemical composition of the grain-oriented electrical steel sheet, is heated to 1,000° C. or higher and hot-rolled and then wound at 400 to 850° C. As necessary, hot-band annealing is performed. Hot-band annealing conditions are not particularly limited, and in consideration of precipitate control, the annealing temperature may be 800 to 1,200° C., and the annealing time may be 10 to 1,000 seconds. Then, a cold-rolled steel sheet is obtained by cold-rolling once, twice or more with intermediate annealing. The cold rolling rate in this case may be 80 to 99% in consideration of control of the texture. The cold-rolled steel sheet is heated, for example, in a wet hydrogen-inert gas atmosphere at 700 to 900° C., decarburized and annealed, and as necessary, subjected to nitridation annealing. Then, after an annealing separator is applied to the steel sheet after annealing, finish annealing is performed at a maximum reaching temperature of 1,000° C. to 1,200° C. for 40 to 90 hours, and an insulation coating is formed at about 900° C. Among the above conditions, particularly, the decarburization annealing and finish annealing influence the crystal grain size of the steel sheet. Therefore, when a wound core is produced, it is preferable to use a grain-oriented electrical steel sheet produced within the above condition ranges.

In addition, generally, the effects of the present embodiment can be obtained even with a steel sheet that has been subjected to a treatment called "magnetic domain control" in the steel sheet producing process by a known method.

As above, the crystal grain size, which is a feature of the grain-oriented electrical steel sheet 1 used in the present embodiment, is preferably adjusted depending on, for example, the maximum reaching temperature and the time of finish annealing. When the average crystal grain size of the entire steel sheet increases in this manner and each crystal grain size is set to FL/2 or more, even if the bent portion 5 is formed at an arbitrary position when a wound core is produced, the above Dpx or the like is expected to be FL/4 or more. In addition, even if crystal grains are relatively fine when a steel sheet is produced, the crystal grains in the vicinity of the bent portion may be coarsened by heating the bent portion after bending. When such partial heating is performed, it is possible to reliably control a specific corner portion such that it has a desired particle size. Since such a partial heat treatment allows strain in the bent portion to be released, it is also effective in improving iron core properties independent of the effects obtained in the present embodiment.

3. Method of Producing Wound Core

The method of producing a wound core according to the present embodiment is not particularly limited as long as the wound core according to the present embodiment can be produced, and for example, a method according to a known wound core introduced in Patent Documents 9 to 11 in the related art may be applied. In particular, it can be said that the method using a production device UNICORE (commercially available from AEM UNICORE) (https://www.aemcores.com.au/technology/unicore/) is optimal.

Here, in order to precisely control the above Dpx, Dpy, and Dpz, it is preferable to control the machining rate (punch speed, mm/sec) during processing and the heating temperature (° C.) and the heating time (sec) in a rapid heat treatment performed after processing. Specifically, the machining rate (punch speed) is preferably 20 to 80 mm/sec. In addition, in a rapid heat treatment performed after processing, preferably, the heating temperature is 90 to 450° C., and the heating time is 6 to 500 seconds.

In addition, according to a known method, as necessary, a heat treatment may be performed. In addition, the obtained wound core main body 10 may be used as a wound core without change or a plurality of stacked grain-oriented electrical steel sheets 1 may be integrally fixed, as necessary, using a known fastener such as a binding band to form a wound core.

The present embodiment is not limited to the above embodiment. The above embodiment is an example, and any embodiment having substantially the same configuration as the technical idea described in the claims of the present invention and exhibiting the same operational effects is included in the technical scope of the present invention.

EXAMPLES

Hereinafter, technical details of the present invention will be additionally described with reference to examples of the present invention. The conditions in the examples shown below are examples of conditions used for confirming the feasibility and effects of the present invention, and the present invention is not limited to these condition examples. In addition, the present invention may use various conditions without departing from the gist of the present invention as long as the object of the present invention is achieved.

(Grain-Oriented Electrical Steel Sheet)

Using a slab having a chemical composition (mass %, the remainder other than the displayed elements is Fe) shown in Table 1 as a material, a final product (product sheet) having a chemical composition (mass %, the remainder other than the displayed elements is Fe) shown in Table 2 was produced. The width of the obtained steel sheet was 1,200 mm.

In Table 1 and Table 2, "—" means that the element was not controlled or produced with awareness of content and its content was not measured. In addition, "<0.002" and "<0.004" mean that the element was controlled and produced with awareness of content, the content was measured, but sufficient measurement values were not obtained with accuracy credibility (detection limit or less).

TABLE 1

| Steel | Slab | | | | | | | | |
|---|---|---|---|---|---|---|---|---|---|
| type | C | Si | Mn | S | Al | N | Cu | Bi | Nb |
| A | 0.070 | 3.26 | 0.07 | 0.025 | 0.026 | 0.008 | 0.07 | — | — |
| B | 0.070 | 3.26 | 0.07 | 0.025 | 0.026 | 0.008 | — | — | 0.007 |
| C | 0.070 | 3.26 | 0.07 | 0.025 | 0.025 | 0.008 | 0.07 | 0.002 | — |
| D | 0.060 | 3.45 | 0.10 | 0.006 | 0.027 | 0.008 | 0.20 | — | 0.005 |

TABLE 2

| Steel | Product sheet | | | | | | | | |
|---|---|---|---|---|---|---|---|---|---|
| type | C | Si | Mn | S | Al | N | Cu | Bi | Nb |
| A | 0.001 | 3.15 | 0.07 | <0.002 | <0.004 | <0.002 | 0.07 | — | — |
| B | 0.001 | 3.15 | 0.07 | <0.002 | <0.004 | <0.002 | 0.07 | — | 0.005 |
| C | 0.001 | 3.15 | 0.07 | <0.002 | <0.004 | <0.002 | 0.07 | 0.002 | — |
| D | 0.001 | 3.34 | 0.10 | <0.002 | <0.004 | <0.002 | 0.20 | — | — |

Here, Table 3 shows details of the steel sheet producing process and conditions.

Specifically, and hot rolling, hot-band annealing, and cold rolling were performed. In a part of the cold-rolled steel sheet after decarburization annealing, a nitridation treatment (nitridation annealing) was performed in a mixed atmosphere containing hydrogen-nitrogen-ammonia.

In addition, an annealing separator mainly composed of MgO was applied and finish annealing was performed. An insulation coating application solution containing chromium and mainly composed of phosphate and colloidal silica was applied to a primary coating formed on the surface of the finish-annealed steel sheet, and heated to form an insulation coating.

In this case, steel sheets with a controlled crystal grain size were produced by adjusting the temperature or time of finish annealing. Table 3 shows details of the produced steel sheets.

TABLE 3

| Steel sheet No. | Steel type | Hot rolling: Heating temperature ° C. | Hot rolling: Finishing temperature ° C. | Hot rolling: Winding temperature ° C. | Hot rolling: Sheet thickness mm | Hot-band annealing: Temperature ° C. | Hot-band annealing: Time sec | Cold rolling: Sheet thickness mm | Cold rolling: Cold rolling rate % |
|---|---|---|---|---|---|---|---|---|---|
| A1 | A | 1150 | 900 | 540 | 3.6 | 1100 | 180 | 0.35 | 90.3 |
| A2 | A | 1150 | 900 | 540 | 3.6 | 1100 | 180 | 0.35 | 90.3 |
| A3 | A | 1150 | 900 | 540 | 3.6 | 1100 | 180 | 0.35 | 90.3 |
| A4 | A | 1150 | 900 | 540 | 3.6 | 1100 | 180 | 0.35 | 90.3 |
| B1 | B | 1150 | 880 | 650 | 2.6 | 1150 | 180 | 0.23 | 91.2 |
| B2 | B | 1150 | 880 | 650 | 2.6 | 1150 | 180 | 0.23 | 91.2 |
| B3 | B | 1150 | 880 | 650 | 2.6 | 1150 | 180 | 0.23 | 91.2 |
| B4 | B | 1150 | 880 | 650 | 2.6 | 1150 | 180 | 0.23 | 91.2 |
| C1 | C | 1150 | 900 | 750 | 2.9 | 1100 | 12 | 0.26 | 91.0 |
| C2 | C | 1150 | 900 | 750 | 2.9 | 1100 | 120 | 0.26 | 91.0 |
| C3 | C | 1150 | 900 | 750 | 2.9 | 1100 | 120 | 0.26 | 91.0 |
| C4 | C | 1150 | 900 | 750 | 2.9 | 1100 | 120 | 0.26 | 91.0 |
| D1 | D | 1350 | 930 | 540 | 2.9 | 1050 | 180 | 0.26 | 91.0 |
| D2 | D | 1350 | 930 | 540 | 2.9 | 1050 | 180 | 0.26 | 91.0 |
| D3 | D | 1350 | 930 | 540 | 2.9 | 1050 | 180 | 0.26 | 91.0 |
| D4 | D | 1350 | 930 | 540 | 2.9 | 1050 | 180 | 0.26 | 91.0 |

| Steel sheet No. | Decarburization annealing: Temperature ° C. | Decarburization annealing: Time sec | Nitriding | Finish annealing: Temperature ° C. | Finish annealing: Time hour | Magnetic domain control | Properties: B8 T | Properties: Iron loss W/kg | Properties: Crystal grain size mm |
|---|---|---|---|---|---|---|---|---|---|
| A1 | 840 | 180 | yes | 1100 | 45 | Control | 1.92 | 0.93 | 16 |
| A2 | 840 | 180 | | 1120 | 50 | by | 1.92 | 0.96 | 24 |
| A3 | 840 | 180 | | 1140 | 55 | electron | 1.91 | 0.98 | 33 |
| A4 | 840 | 180 | | 1160 | 60 | beam | 1.90 | 1.02 | 39 |
| B1 | 840 | 180 | yes | 1100 | 45 | Control | 1.94 | 0.68 | 17 |
| B2 | 840 | 180 | | 1120 | 50 | by | 1.94 | 0.69 | 23 |
| B3 | 840 | 180 | | 1140 | 55 | laser | 1.92 | 0.74 | 31 |
| B4 | 840 | 180 | | 1160 | 60 | | 1.93 | 0.74 | 40 |
| C1 | 870 | 180 | yes | 1100 | 55 | Control | 1.94 | 0.73 | 15 |
| C2 | 870 | 180 | | 1120 | 60 | by | 1.93 | 0.75 | 27 |
| C3 | 870 | 180 | | 1140 | 65 | etching | 1.91 | 0.78 | 38 |
| C4 | 870 | 180 | | 1160 | 70 | | 1.90 | 0.81 | 51 |
| D1 | 870 | 180 | no | 1100 | 65 | Control | 1.94 | 0.74 | 12 |
| D2 | 870 | 180 | | 1120 | 70 | by | 1.92 | 0.76 | 25 |
| D3 | 870 | 180 | | 1140 | 75 | mechanical | 1.92 | 0.75 | 34 |
| D4 | 870 | 180 | | 1160 | 80 | strain | 1.91 | 0.77 | 42 |

(Iron Core)

Figure 8:
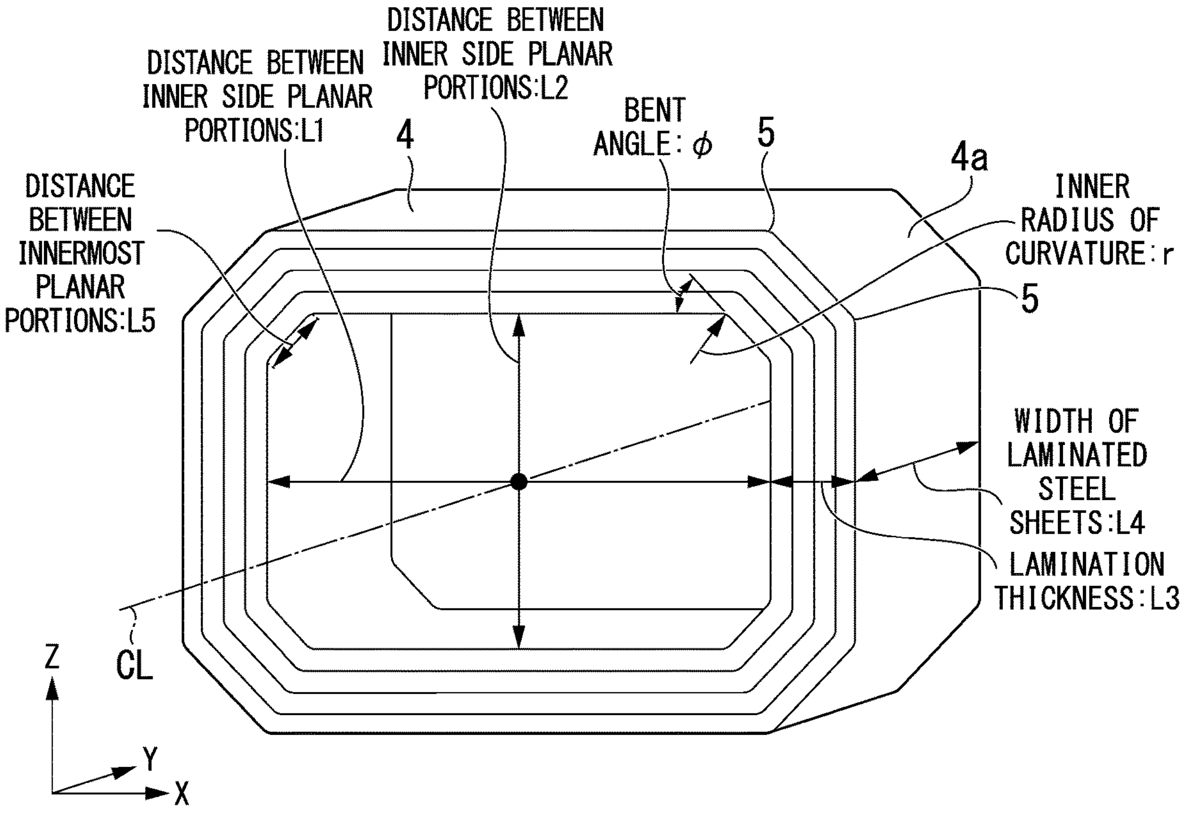
FIG. 8 is a schematic view showing size parameters of wound cores produced in examples and comparative examples.

The cores Nos. a to e of the iron cores having shapes shown in Table 4 and FIG. 8 were produced using respective steel sheets as materials. Here, L1 is parallel to the X-axis direction and is a distance between parallel grain-oriented electrical steel sheets 1 on the innermost periphery of the wound core in a flat cross section including the center CL (a distance between inner side planar portions), L2 is parallel to the Z-axis direction and is a distance between parallel grain-oriented electrical steel sheets 1 on the innermost periphery of the wound core in a vertical cross section including the center CL (a distance between inner side planar portions), L3 is parallel to the X-axis direction and is a stacking thickness of the wound core in a flat cross section including the center CL (a thickness in the stacking direction), L4 is parallel to the X-axis direction and is a width of the stacked steel sheets of the wound core in a flat cross section including the center CL, and L5 is a distance between planar portions that are adjacent to each other in the innermost portion of the wound core and arranged to form a right angle together (a distance between bent portions). In other words, L5 is a length of the planar portion 4*a* in the longitudinal direction having the shortest length among the planar portions 4 and 4*a* of the grain-oriented electrical steel sheets on the innermost periphery. r is the radius of curvature (mm) of the bent portion on the inner side of the wound core, and p is the bent angle (°) of the bent portion of the wound core. The cores Nos. a to e of the substantially rectangular iron cores have a structure in which a planar portion with an inner side planar portion distance of L1 is divided at approximately in the center of the distance L1 and two iron cores having "substantially a U-shape" are connected.

TABLE 4

| Core No. | Core shape L1 mm | L2 mm | L3 mm | L4 mm | L5 mm | r mm | φ ° |
|---|---|---|---|---|---|---|---|
| a | 197 | 66 | 45 | 150 | 16 | 1 | 45 |
| b | 197 | 66 | 45 | 150 | 18 | 3 | 45 |

TABLE 4-continued

| Core No. | Core shape L1 mm | L2 mm | L3 mm | L4 mm | L5 mm | r mm | φ ° |
|---|---|---|---|---|---|---|---|
| c | 197 | 66 | 45 | 150 | 20 | 5 | 45 |
| d | 197 | 66 | 55 | 150 | 20 | 2 | 30 |
| e | 197 | 66 | 55 | 150 | 20 | 6 | 45 |

(Evaluation Method)

(1) Magnetic Properties of Grain-Oriented Electrical Steel Sheet

The magnetic properties of the grain-oriented electrical steel sheet were measured based on a single sheet magnetic property test method (Single Sheet Tester: SST) specified in JIS C 2556: 2015.

As the magnetic properties, the magnetic flux density B8(T) of the steel sheet in the rolling direction when excited at 800 A/m and the iron loss of the steel sheet at an AC frequency of 50 Hz and an excitation magnetic flux density of 1.7 T were measured.

(2) Particle Size in Iron Core

As described above, 12 crystal grain sizes (Dcii, Dcio, Dcoi, Dcoo, Dlii, Dlio, Dloi, Dloo, Dpii, Dpio, Dpoi, Dpoo) were determined by observing both surfaces of the steel sheet extracted from the iron core.

(3) Noise of Iron Core

The noise of the iron core was measured based on a method of IEC60076-10 for the iron core formed of each steel sheet as a material. Here, in this example, when the noise was less than 29.0 dB, it was evaluated that deterioration of iron loss efficiency was minimized.

The efficiency was evaluated for various iron cores produced using various steel sheets with different magnetic domain widths. The results are shown in Table 5. It can be understood that the efficiency of the iron core could be improved by appropriately controlling the crystal grain size even if the same steel type was used.

TABLE 5

| Test No. | Steel sheet No. | Core No. | Processing conditions: Processing rate (mm/sec) | Rapid heating temperature after processing (° C.) | Rapid heating time after processing (sec) | Iron core properties: FL mm | Dpx mm | Dpy mm | Dpy mm | Noise | Note |
|---|---|---|---|---|---|---|---|---|---|---|---|
| 1-1 | A1 | a | 5 | 100 | 10 | 30.0 | 3.12 | 5.13 | 5.34 | 32.3 | Comparative Example |
| 1-2 | A2 | a | 20 | 100 | 10 | 30.0 | 4.58 | 7.46 | 8.45 | 28.4 | Example of invention |
| 1-3 | A3 | a | 40 | 300 | 10 | 30.0 | 7.44 | 12.37 | 14.67 | 25.1 | Example of invention |
| 1-4 | A4 | a | 80 | 450 | 10 | 30.0 | 9.46 | 17.34 | 16.54 | 23.4 | Example of invention |
| 1-5 | B1 | a | 5 | 300 | 200 | 30.0 | 3.09 | 5.74 | 5.55 | 31.8 | Comparative Example |
| 1-6 | B2 | a | 20 | 200 | 200 | 30.0 | 4.37 | 7.67 | 7.49 | 28.0 | Example of invention |
| 1-7 | B3 | a | 40 | 200 | 200 | 30.0 | 7.34 | 11.14 | 13.48 | 25.6 | Example of invention |
| 1-8 | B4 | a | 80 | 200 | 200 | 30.0 | 10.23 | 17.34 | 19.24 | 22.7 | Example of invention |
| 1-9 | C1 | a | 5 | 150 | 50 | 30.0 | 3.12 | 5.57 | 5.17 | 32.5 | Comparative Example |
| 1-10 | C2 | a | 20 | 150 | 50 | 30.0 | 4.68 | 8.87 | 7.43 | 27.7 | Example of invention |

TABLE 5-continued

| | | | Processing conditions | | | Iron core properties | | | | | |
|---|---|---|---|---|---|---|---|---|---|---|---|
| Test No. | Steel sheet No. | Core No. | Processing rate (mm/sec) | Rapid heating temperature after processing (° C.) | Rapid heating time after processing (sec) | FL mm | Dpx mm | Dpy mm | Dpy mm | Noise | Note |
| 1-11 | C3 | a | 40 | 150 | 50 | 30.0 | 7.48 | 14.79 | 12.44 | 24.8 | Example of invention |
| 1-12 | C4 | a | 80 | 150 | 50 | 30.0 | 12.39 | 20.06 | 23.40 | 22.2 | Example of invention |
| 1-13 | D1 | a | 5 | 90 | 500 | 30.0 | 2.35 | 4.32 | 3.84 | 31.6 | Comparative Example |
| 1-14 | D2 | a | 20 | 90 | 500 | 30.0 | 4.34 | 7.35 | 8.36 | 27.6 | Example of invention |
| 1-15 | D3 | a | 40 | 90 | 500 | 30.0 | 5.34 | 10.34 | 8.14 | 26.3 | Example of invention |
| 1-16 | D4 | a | 80 | 90 | 500 | 30.0 | 9.57 | 15.36 | 17.17 | 23.1 | Example of invention |
| 1-17 | A1 | b | 5 | 450 | 6 | 28.0 | 3.22 | 5.33 | 5.87 | 32.4 | Comparative Example |
| 1-18 | A3 | b | 20 | 450 | 6 | 28.0 | 6.88 | 12.41 | 12.07 | 25.1 | Example of invention |
| 1-19 | B1 | b | 5 | 450 | 6 | 28.0 | 3.34 | 5.99 | 5.37 | 32.6 | Comparative Example |
| 1-20 | B3 | b | 80 | 450 | 6 | 28.0 | 5.17 | 8.86 | 10.68 | 25.7 | Example of invention |
| 1-21 | C1 | c | 5 | 200 | 10 | 26.0 | 2.51 | 5.07 | 4.14 | 33.5 | Comparative Example |
| 1-22 | C3 | c | 20 | 200 | 10 | 26.0 | 7.22 | 13.43 | 10.96 | 23.5 | Example of invention |
| 1-23 | D1 | d | 5 | 200 | 10 | 18.0 | 2.34 | 4.07 | 3.95 | 31.4 | Comparative Example |
| 1-24 | D3 | d | 80 | 200 | 10 | 18.0 | 6.81 | 12.63 | 11.53 | 23.6 | Example of invention |
| 1-25 | A1 | e | 10 | 450 | 10 | 28.0 | 3.11 | 5.67 | 5.21 | 31.2 | Comparative Example |
| 1-26 | A3 | e | 20 | 450 | 10 | 28.0 | 7.06 | 11.81 | 12.67 | 32.4 | Comparative Example |
| 1-27 | B1 | e | 40 | 450 | 10 | 28.0 | 3.21 | 5.69 | 5.47 | 31.5 | Comparative Example |
| 1-28 | B3 | e | 80 | 450 | 10 | 28.0 | 6.25 | 10.79 | 11.24 | 29.4 | Comparative Example |

Based on the above results, it can be clearly understood that, in the wound core of the present invention, the crystal grain sizes Dpx, Dpy and Dpz of the stacked grain-oriented electrical steel sheets each were FL/4 or more so that it was possible to effectively minimize the generation of unintentional noise.

INDUSTRIAL APPLICABILITY

According to the present invention, in the wound core formed by stacking bent steel sheets, it is possible to effectively minimize deterioration of efficiency of the iron core.

BRIEF DESCRIPTION OF THE REFERENCE SYMBOLS

1 Grain-oriented electrical steel sheet
2 Laminated structure
3 Corner portion
4 First planar portion (planar portion)
4*a* Second planar portion (planar portion)
5 Bent portion
6 Joining part
10 Wound core main body

What is claimed is:

1. A wound core including a wound core main body obtained by stacking a plurality of polygonal annular grain-oriented electrical steel sheets in a sheet thickness direction in a side view, wherein the grain-oriented electrical steel sheet has planar portions and bent portions that are alternately continuous in a longitudinal direction, wherein the bent portion in a side view has an inner radius of curvature r of 1 mm or more and 5 mm or less, wherein the grain-oriented electrical steel sheets have a chemical composition containing, in mass %, Si: 2.0 to 7.0%, with the remainder comprising Fe and impurities, and have a texture oriented in the Goss orientation, and in at least one of the bent portions, the crystal grain size Dpx (mm) of the stacked grain-oriented electrical steel sheet is FL/4 or more, where Dpx (mm) is an average value of Dp obtained by the following Formula (1), Dc (mm) is an average crystal grain size in a direction in which a boundary line extends at respective boundaries between the bent portion and two planar portions arranged with the bent portion therebetween, Dl (mm) is an average crystal grain size in a direction perpendicular to a direction in which the boundary line extends at the boundary, FL (mm) is an average length of a shorter planar portion between two adjacent planar portions with the bent portion therebetween, and the average value of Dp is an average value of Dp on the inner side and Dp on the outer side of one planar portion between two planar portions and Dp on the inner side and Dp on the outer side of the other planar portion:

$$Dp=\sqrt{(Dc\times Dl/\pi)}. \quad (1)$$

2. A wound core including a wound core main body obtained by stacking a plurality of polygonal annular grain-oriented electrical steel sheets in a sheet thickness direction in a side view, wherein the grain-oriented electrical steel sheet has planar portions and bent portions that are alternately continuous in a longitudinal direction, wherein the bent portion in a side view has an inner radius of curvature r of 1 mm or more and 5 mm or less, wherein the grain-oriented electrical steel sheets have a chemical composition containing, in mass %, Si: 2.0 to 7.0%, with the remainder comprising Fe and impurities, and have a texture oriented in the Goss orientation, and in at least one of the bent portions, the crystal grain size Dpy (mm) of the stacked grain-oriented electrical steel sheet is FL/4 or more, where Dpy (mm) is an average value of Dl (mm), Dl (mm) is an average crystal grain size in a direction perpendicular to a direction in which a boundary line extends at respective boundaries between the bent portion and two planar portions arranged with the bent portion therebetween, FL (mm) is an average length of a shorter planar portion between two adjacent planar portions with the bent portion therebetween, and the average value of Dl is an average value of Dl on the inner side and Dl on the outer side of one planar portion between two planar portions and Dl on the inner side and Dl on the outer side of the other planar portion.

3. A wound core including a wound core main body obtained by stacking a plurality of polygonal annular grain-oriented electrical steel sheets in a sheet thickness direction in a side view, wherein the grain-oriented electrical steel sheet has planar portions and bent portions that are alternately continuous in a longitudinal direction, wherein the bent portion in a side view has an inner radius of curvature r of 1 mm or more and 5 mm or less, wherein the grain-oriented electrical steel sheets have a chemical composition containing, in mass %, Si: 2.0 to 7.0%, with the remainder comprising Fe and impurities, and have a texture oriented in the Goss orientation, and in at least one of the bent portions, the crystal grain size Dpz (mm) of the stacked grain-oriented electrical steel sheet is FL/4 or more, where Dpz (mm) is an average value of Dc (mm), Dc (mm) is an average crystal grain size in a direction in which a boundary line extends at respective boundaries between the bent portion and two planar portions arranged with the bent portion therebetween, FL (mm) is an average length of a shorter planar portion between two adjacent planar portions with the bent portion therebetween, and the average value of Dc is an average value of Dc on the inner side and Dc on the outer side of one planar portion between two planar portions and Dc on the inner side and Dp on the outer side of the other planar portion.

* * * * *